United States Patent
Iwasa et al.

(10) Patent No.: US 10,091,497 B2
(45) Date of Patent: Oct. 2, 2018

(54) NIGHT VISION IMAGING SYSTEM ACUITY VERIFICATION TEST FIXTURE

(71) Applicant: THE BOEING COMPANY, Chicago, IL (US)

(72) Inventors: Dale T. Iwasa, Edmonds, WA (US); Larry P. Pine, Granite Falls, WA (US); Joseph T. Riegler, Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 270 days.

(21) Appl. No.: 15/015,856

(22) Filed: Feb. 4, 2016

(65) Prior Publication Data
US 2017/0230648 A1   Aug. 10, 2017

(51) Int. Cl.
| | | |
|---|---|---|
| *G01N 21/00* | (2006.01) | |
| *H04N 17/00* | (2006.01) | |
| *G02B 7/182* | (2006.01) | |
| *B64D 47/02* | (2006.01) | |

(52) U.S. Cl.
CPC ........... *H04N 17/002* (2013.01); *B64D 47/02* (2013.01); *G02B 7/182* (2013.01)

(58) Field of Classification Search
CPC .......... B64D 47/02; G02B 7/182; G09B 9/16; G09B 9/36; G09B 9/32
USPC .......................................................... 356/72
See application file for complete search history.

(56) References Cited

U.S. PATENT DOCUMENTS

| | | | |
|---|---|---|---|
| 5,380,204 A | 1/1995 | Decker | |
| 5,460,528 A * | 10/1995 | Wentworth | F41G 3/26 385/115 |
| 7,235,779 B1 * | 6/2007 | Pinkus | G01J 1/08 250/252.1 |
| 7,391,504 B1 | 6/2008 | Pinkus et al. | |
| 8,337,206 B2 | 12/2012 | Taffet | |
| 9,110,034 B1 * | 8/2015 | Cranton | G01L 1/1645 |
| 2003/0152893 A1 * | 8/2003 | Edgar | G09B 9/08 434/37 |
| 2010/0033979 A1 * | 2/2010 | Duranti | F21S 8/006 362/471 |

OTHER PUBLICATIONS

Extended European Search Report for Application No. 16200603.5-1562 dated Jul. 7, 2017.
http://sensing.konicaminalta.us/products/dts-140-nvis/support/DTS140NVIS_Final.pdf.

* cited by examiner

*Primary Examiner* — Mark Hellner
(74) *Attorney, Agent, or Firm* — Patterson + Sheridan, LLP

(57) ABSTRACT

Method and apparatus for testing visual acuity of a night vision imaging system using a visual target. A fixture arranges a mirror a first distance from the night vision imaging system and arranges the visual target a second distance from the mirror. A sum of the first distance and the second distance equals a target distance between the night vision imaging system and the visual target. The fixture includes a starlight generator that can illuminate the visual target with simulated starlight and/or moonlight that stimulates the night vision imaging system.

20 Claims, 8 Drawing Sheets

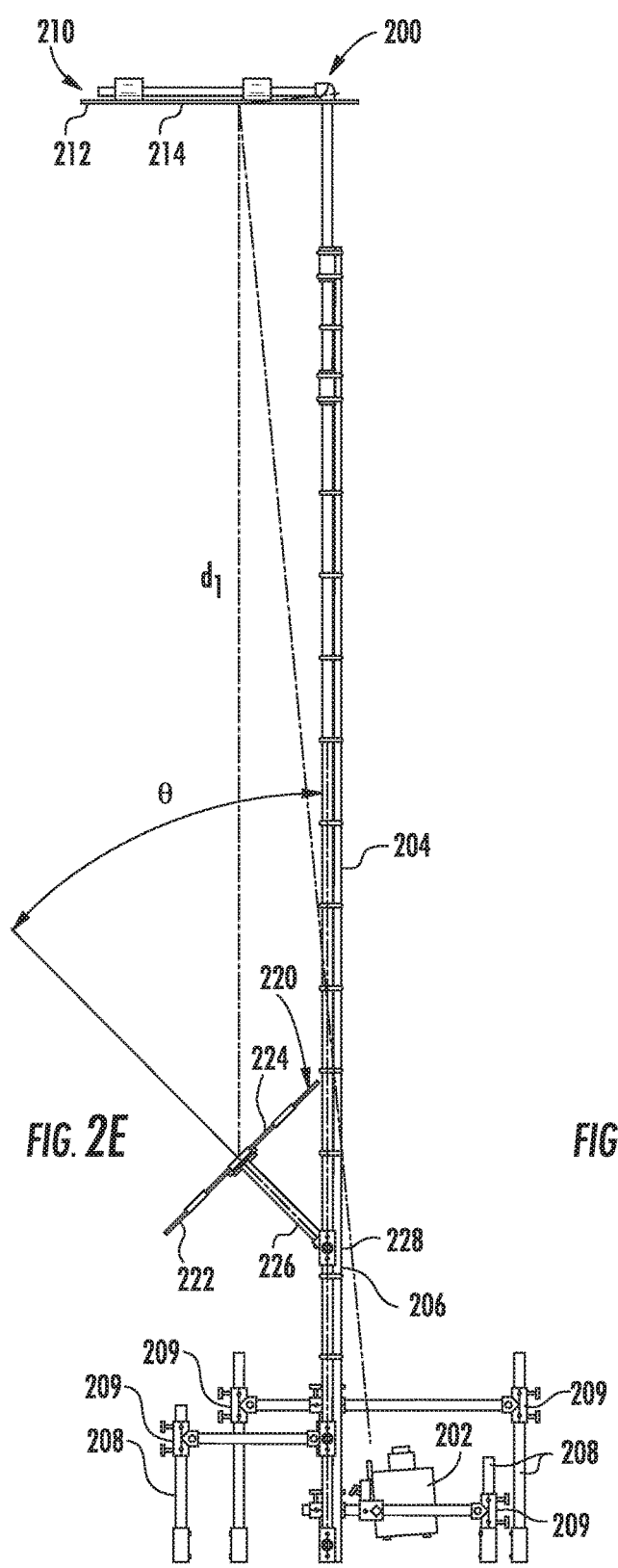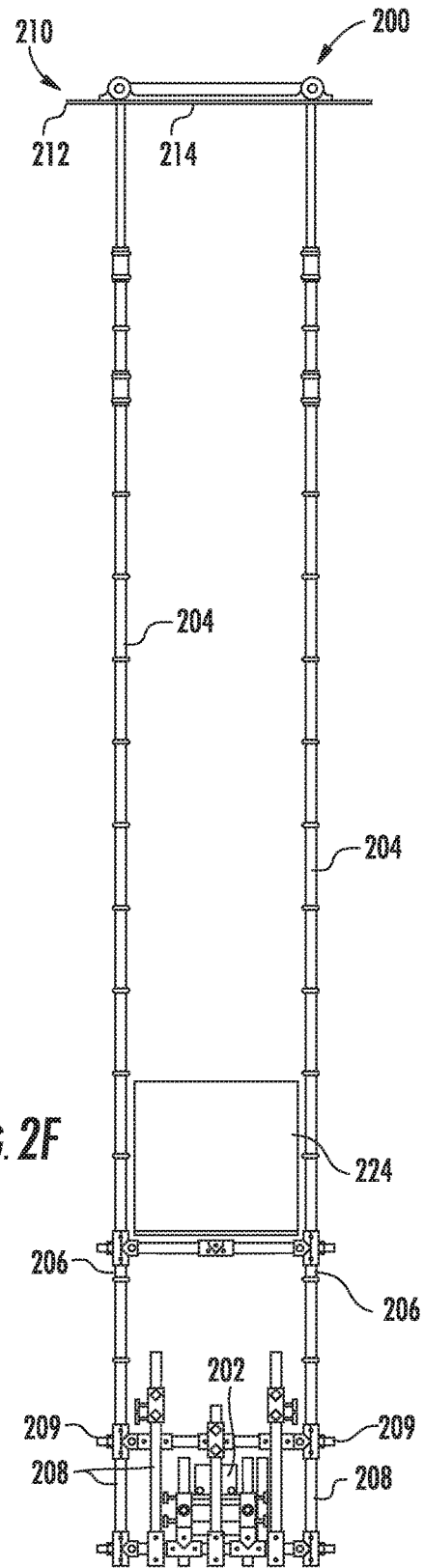

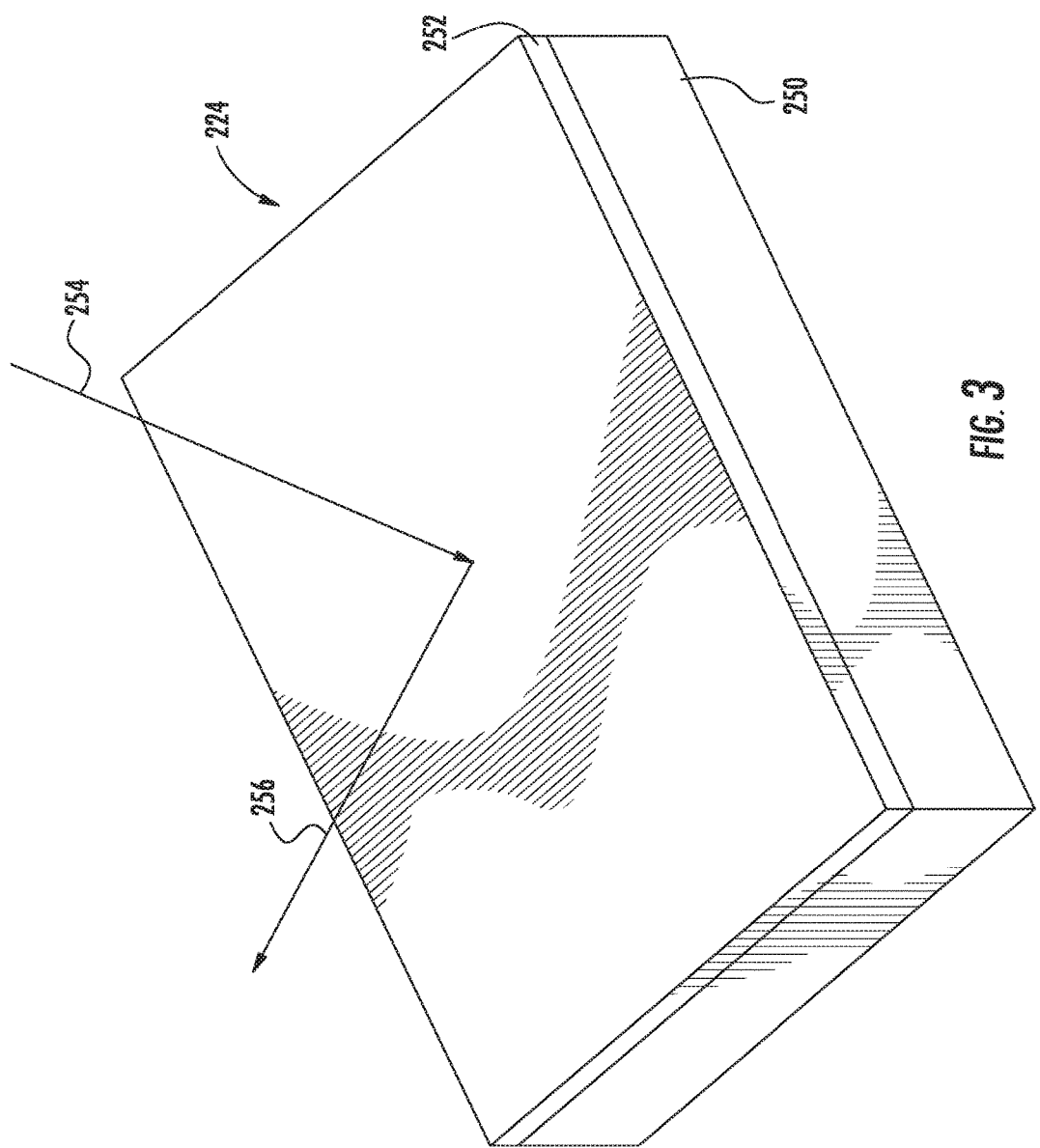

NIGHT VISION IMAGING SYSTEM ACUITY VERIFICATION TEST FIXTURE

BACKGROUND

Aspects described herein relate to a fixture for holding and displaying a visual target, and more specifically, to displaying a reflection of the visual target using a mirror to increase a viewing distance from a viewing location.

Night vision imaging systems, such as night vision goggles, are sometimes used by vehicle operators, such as pilots, to see the environment in dark conditions. Typically, night vision imaging systems use image intensifier tubes to amplify starlight and/or moonlight to generate images of an outdoor environment and display the generated images on a view screen. The flight deck of an aircraft typically includes illumination so that pilots can read the instruments, read checklists or maps, or perform additional tasks. For example, the flight deck may include various instruments with backlighting and/or floodlights to illuminate the flight deck. When used in the aircraft cockpit, the primary function of night vision goggles (NVGs) is to provide intensified imagery of distant objects in the outside environment. NVGs are very sensitive to light, and it is undesirable for NVGs to sense and intensify light from any sources other than those in the outside environment. Cockpit instruments and displays must remain readable at night by the unaided eye, but any cockpit lighting that is sensed and intensified by the NVG may cause circuitry in the NVGs to automatically decrease an intensifier gain, thereby degrading the NVG-aided visual acuity of the outside environment.

To ensure that a night vision imaging system is not amplifying flight deck illumination excessively, the effect of cockpit lighting on a night vision imaging system is typically tested in a flight simulator environment. During this test, a pilot or other person using the night vision imaging system (e.g., wearing night vision goggles) sits in a pilot's seat in a flight deck cockpit or simulator with cockpit instruments set to a night lighting mode. In the night mode, the outside environment is dark (e.g., a display screen is displaying a night scene or the display screen is blank) and the flight deck illumination is turned on. During the test, the pilot wearing the NVGs attempts to read a visual target, such as the United States Air Force 1951 Medium Contrast Resolution Resolving Power Target, which is illuminated using a starlight generator that simulates starlight illumination and radiance. The pilot or other operator identifies the target element that can just be discerned with no flight deck illumination. The flight deck illumination is then turned on to determine the effect, if any, the illumination has on the ability of the pilot or other operator to discern the target elements. Any changes in the ability to see the target can result in the need to make changes to the flight deck lighting design.

SUMMARY

According to one aspect, an apparatus includes a night vision test fixture configured to be arranged between an enclosure and a display screen, wherein the enclosure houses a flight simulator flight deck that includes a pilot seat, and wherein the pilot seat and the display screen define a sight line. The night vision test fixture includes a support structure. The night vision test fixture also includes a mounting plate supporting a mirror and arranged such that the mirror intersects the sight line. The night vision test fixture also includes a visual target holder attached to the support structure and supporting a visual target. The night vision test fixture also includes a starlight generator attached to the support structure and arranged to output starlight on the visual target supported by the visual target holder. At least one of the mounting plate and the visual target holder is adjustable to direct a reflected image of the visual target from the mirror to the pilot seat. At least one of the mounting plate and the visual target holder is adjustable such that a sum of a distance from the pilot seat to the mirror and a distance from the mirror to the visual target is equal to a target distance.

According to one aspect, a night vision test fixture includes a support structure. The night vision test fixture also includes a visual target holder attached to the support structure and supporting a visual target. The night vision test fixture also includes a mounting plate supporting a mirror and attached to the support structure. At least one of the mounting plate and the visual target holder is adjustable to direct a reflected image of the visual target from the mirror in a direction of a sight line. The night vision test fixture also includes a starlight generator attached to the support structure and arranged to output starlight on the visual target supported by the visual target holder.

According to one aspect, a method for testing use of a night vision imaging system in a confined space includes illuminating a visual target using a starlight generator. The visual target is arranged at a first distance from a mirror. The mirror is arranged along a sight line and a second distance from a viewing location in the confined space. A sum of the first distance and the second distance is equal to a target distance. The mirror is positioned such that an image of the visual target reflected by the mirror is directed to the viewing location. The method also includes using the night vision imaging system to discern the visual target from the viewing location.

BRIEF DESCRIPTION OF THE SEVERAL VIEWS OF THE DRAWINGS

FIG. 2E is a side view of the night vision test fixture of FIG. 1A with the mirror installed on the mirror assembly and a visual target installed on a visual target assembly;

FIG. 2F is a front view of the night vision test fixture of FIG. 1A with the mirror installed on the mirror assembly and the visual target installed on the visual target assembly;

FIG. 3 is a perspective view of the mirror illustrated in FIGS. 2B, 2E, and 2F;

DETAILED DESCRIPTION

Figure 1A:
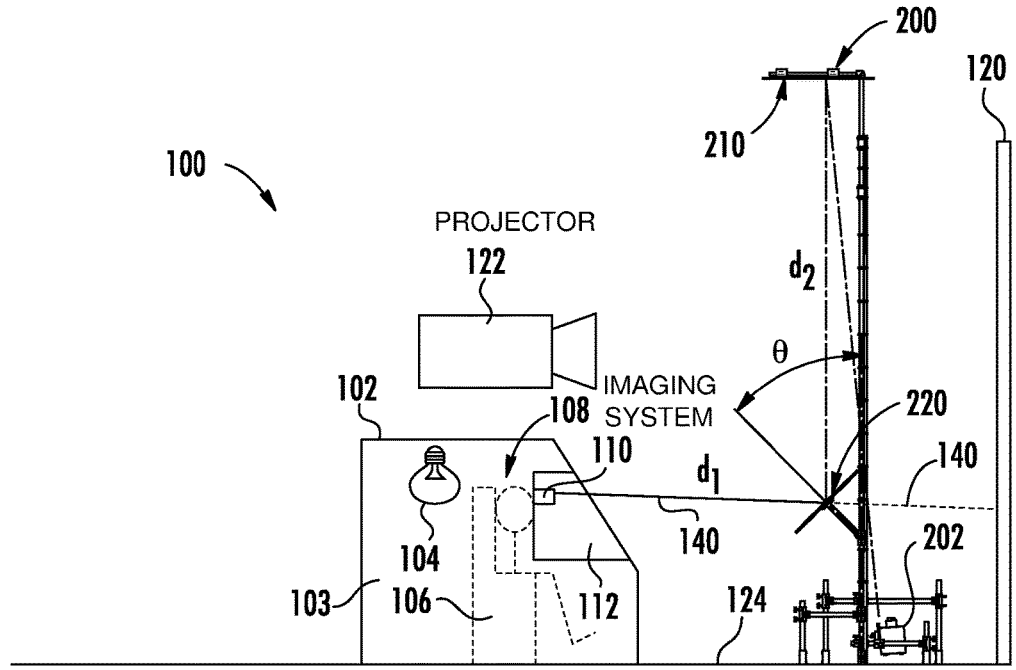
FIG. 1A is a side view of a flight simulator with a night vision test fixture arranged therewith.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Night vision imaging systems, such as night vision goggles, are sometimes used by vehicle operators, such as pilots, to see the environment in dark conditions. Typically, night vision imaging systems use image intensifier tubes to amplify starlight and/or moonlight to generate images of an outdoor environment and display the generated images on a view screen. The flight deck of an aircraft typically includes illumination so that pilots can read the instruments, read checklists or maps, or perform additional tasks. For example, the flight deck may include various instruments with backlighting and/or floodlights to illuminate the flight deck. When used in the aircraft cockpit, the primary function of night vision goggles (NVGs) is to provide intensified imagery of distant objects in the outside environment. NVGs are very sensitive to light, and it is undesirable for NVGs to sense and intensify light from any sources other than those in the outside environment. Cockpit instruments and displays must remain readable at night by the unaided eye, but any cockpit lighting that is sensed and intensified by the NVG may cause circuitry in the NVGs to automatically decrease an intensifier gain, thereby degrading the NVG-aided visual acuity of the outside environment.

To ensure that a night vision imaging system is not amplifying flight deck illumination excessively, the effect of cockpit lighting on a night vision imaging system is typically tested in a flight simulator environment. During this test, a pilot or other person using the night vision imaging system (e.g., wearing night vision goggles) sits in a pilot's seat in a flight deck cockpit or simulator with cockpit instruments set to a night lighting mode. In the night mode, the outside environment is dark (e.g., a display screen is displaying a night scene or the display screen is blank) and the flight deck illumination is turned on. During the test, the pilot wearing the NVGs attempts to read a visual target, such as the United States Air Force 1951 Medium Contrast Resolution Resolving Power Target, which is illuminated using a starlight generator that simulates starlight illumination and radiance. The pilot or other operator identifies the target element that can just be discerned with no flight deck illumination. The flight deck illumination is then turned on to determine the effect, if any, the illumination has on the ability of the pilot or other operator to discern the target elements. Any changes in the ability to see the target can result in the need to make changes to the flight deck lighting design.

The above-described test is typically performed with the visual target set at a target distance from the pilot or other operator using the night vision imaging system. For example, one testing standard specifies that the United States Air Force 1951 Medium Contrast Resolution Resolving Power Target be located 20 feet away from the pilot's or other operator's eye using the night vision imaging system. However, in some environments, such as a flight simulator environment, there may not be sufficient room to place the visual target 20 feet from the pilot or other operator using the night vision imaging system. To a certain degree, the visual target could be scaled down such that the visual target could be placed closer to the pilot or other operator using the night vision imaging system. For example, if the visual target can be placed at a distance of 19 feet instead of 20 feet from the night vision imaging system (a 5% decrease in distance), then the visual target could be scaled down by 5% as well to maintain the same visual target size. However, there may be limits on how close the target can be moved to the night vision imaging system (and how much the target can be shrunk). For example, night vision imaging systems, such as night vision goggles, often have a minimum focusing distance such that the visual target can only be placed so close to the night vision imaging system. Also, in certain scenarios, testing requirements could set a minimum distance between the visual target and the night vision imaging system.

In various aspects described herein, a test fixture can be installed in front of a confined space, such as a flight deck of a flight simulator or a flight deck of an actual aircraft, for testing a night vision imaging system in combination with illumination in the confined space. The test fixture arranges a visual target and a mirror relative to the confined space such that pilot or other operator using the night vision imaging system in the confined space views a reflected image of the visual target from the mirror. By reflecting the image of the visual target using the mirror, an effective distance between the night vision imaging system and the visual target can be increased. Continuing the example above in which a testing standard requires that the night vision imaging system be 20 feet from the visual target, the mirror of the test fixture could be placed a first distance of 5 feet from the night vision imaging system and the visual target could be placed a second distance of 15 feet from the mirror. The sum of the first distance and the second distance is 20 feet.

FIG. 1A is a side view of a flight simulator 100 with a night vision test fixture 200 arranged therewith. The flight simulator 100 includes an enclosure 102 housing a simulator flight deck 103. In this exemplary aspect, the simulator flight deck 103 is configured like a flight deck for a commercial aircraft, a military cargo plane, or similar type of aircraft. The enclosure 102 includes windows 112 that allows a pilot 108 or other operator sitting in a pilot seat 106 to view a display screen 120. The display screen 120 could be a computer monitor, such as a liquid crystal display (LCD) monitor. The display screen 120 could alternatively be a reflective screen that displays images output by a video projector 122. The pilot seat 106 and the display screen 120 define a sight line 140 (i.e., a line of sight from the pilot 108 or other operator to the display screen 120). The flight deck 103 includes illumination 104. As discussed above, the illumination could include instrument back lighting and/or floodlights in the flight deck 103. In the simulator environment, the illumination 104 could be identical to that in the flight deck of an actual aircraft. For example, the illumination 104 for the flight deck 103 of the flight simulator 100 could use the same types of light bulbs, light emitting diodes, and other light sources as are used on the flight deck of the actual aircraft.

The night vision test fixture 200 is arranged between the enclosure 102 and the display screen 120. The night vision test fixture 200 includes a visual target assembly 210 and a mirror assembly 220. As will be discussed in greater detail below with reference to FIGS. 2A-2F, the visual target is part of the visual target assembly 210 and the mirror is part of the mirror assembly 220. The mirror assembly 220 is arranged a distance $d_1$ along a sight line 140 from the pilot seat 106 to the display screen 120 and the visual target assembly 210 is arranged to distance $d_2$ from the mirror assembly 220. The night vision test fixture 200 can be positioned relative to the enclosure 102 and the visual target assembly 210 can be positioned relative to the mirror assembly 220 such that the sum of the distances $d_1$ and $d_2$ is substantially equal to a distance specified in testing requirements for a night vision imaging system 110 (e.g., night vision goggles) used by the pilot 108. The night vision test fixture 200 includes a starlight generator 202 that illuminates the visual target assembly 210 with simulated starlight, which will be amplified by the night vision imaging system.

Figure 1B:
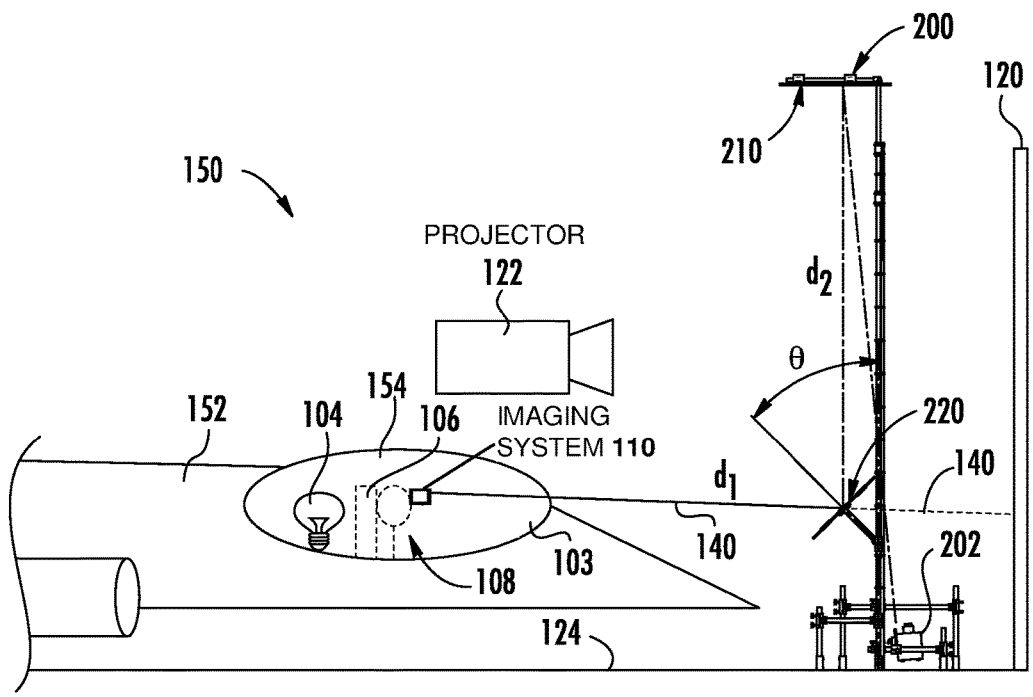
FIG. 1B is a side view of a flight simulator with the night vision test fixture arranged therewith.

FIG. 1B illustrates a different circumstance in which the night vision test fixture 200 is arranged in front of a flight deck (i.e., cockpit) 103 of a flight simulator 150 for a fighter aircraft. In this exemplary circumstance, a body 152 or a portion of the body of the fighter aircraft is the enclosure 154 for the flight deck 103. The night vision test fixture 200 can be arranged between the body 152 and a display screen 120 of the flight simulator 150.

In various aspects, the night vision test fixture 200 could be used with a real aircraft. For example, still referring to FIG. 1B, the body 152 could be a real aircraft in a hangar, for example. The night vision test fixture 200 could be placed in front of the aircraft. For the purposes of testing a night vision imaging system, the hangar could be dark (e.g., all lights turned off and all doors closed such that the ambient illumination is 0.0001 foot-candles (Fc) or less). Thereafter, the visual target assembly 210 is illuminated by the starlight generator 202 and a pilot 108 or other operator wearing night vision goggles or using another night vision imaging system 110 could try to read the visual target on the visual target assembly 210.

Figure 1C:
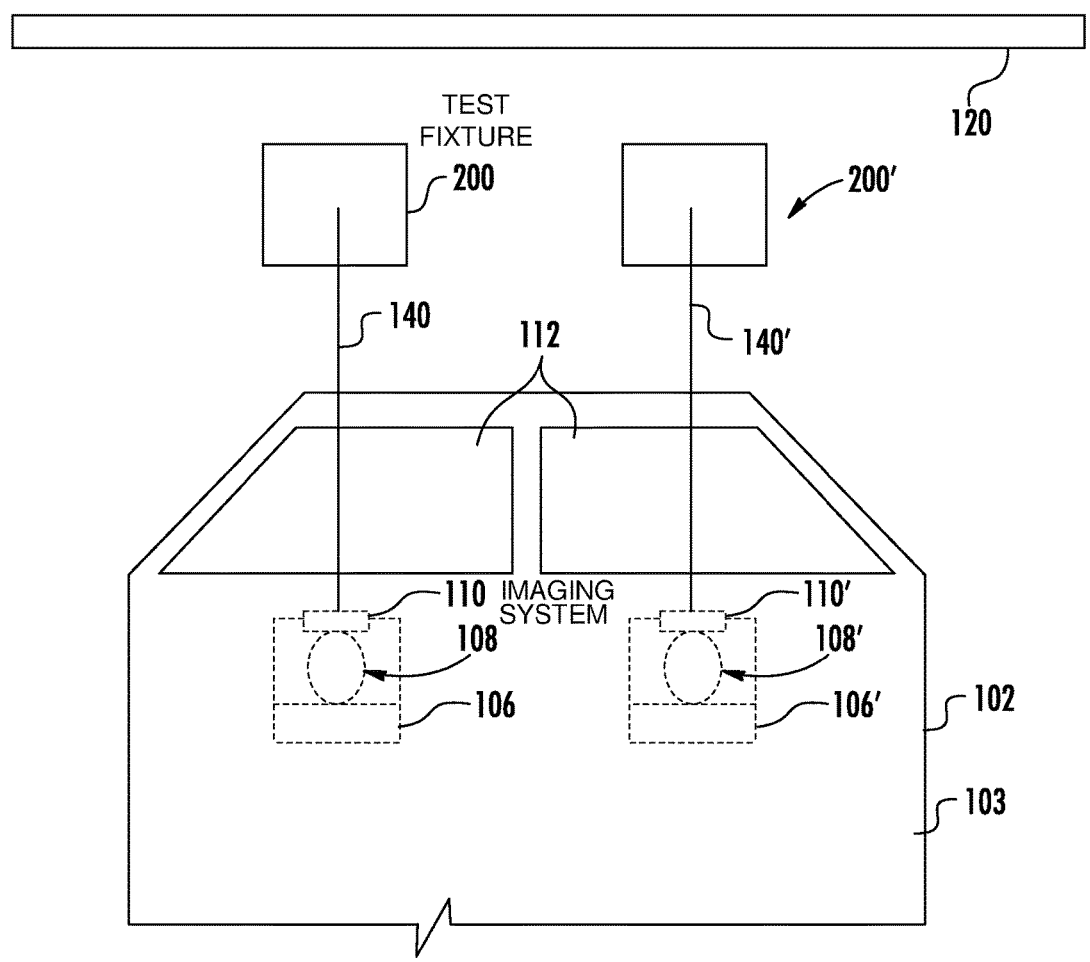
FIG. 1C is a top view of the flight simulator of FIG. 1A.
Figures 2A, 2B:
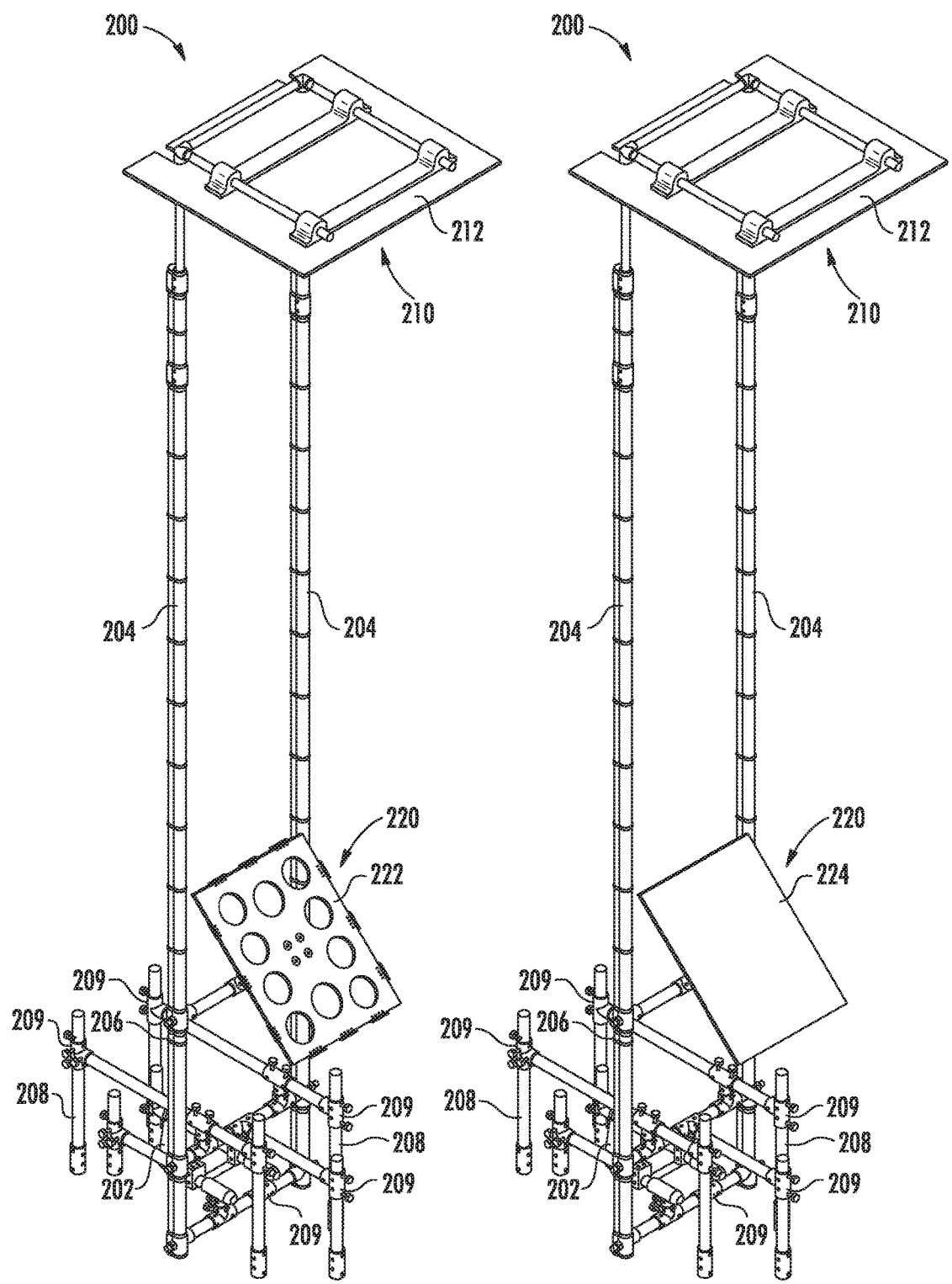
FIG. 2A is a perspective view of the night vision test fixture of FIG. 1A.
FIG. 2B is a perspective view of the night vision test fixture of FIG. 1A with a mirror installed on a mirror assembly.
Figure 2C:
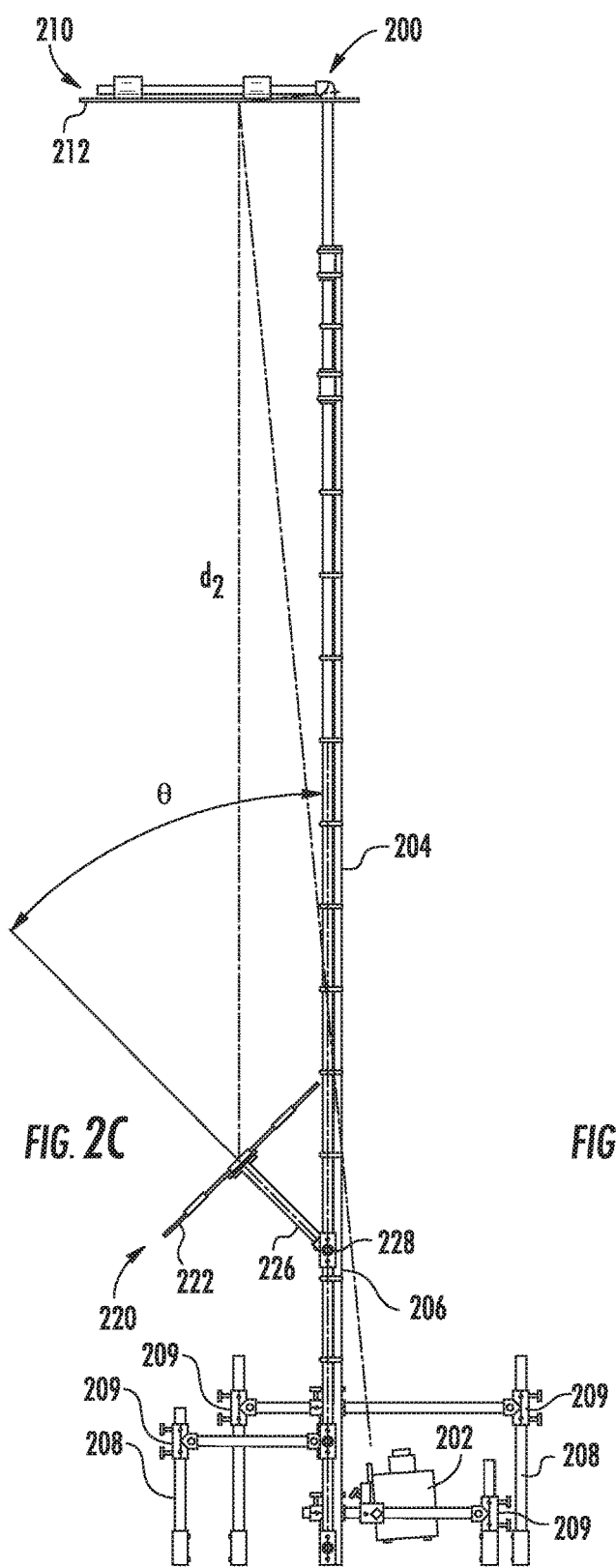
FIG. 2C is a side view of the night vision test fixture of FIG. 1A.
Figure 2D:
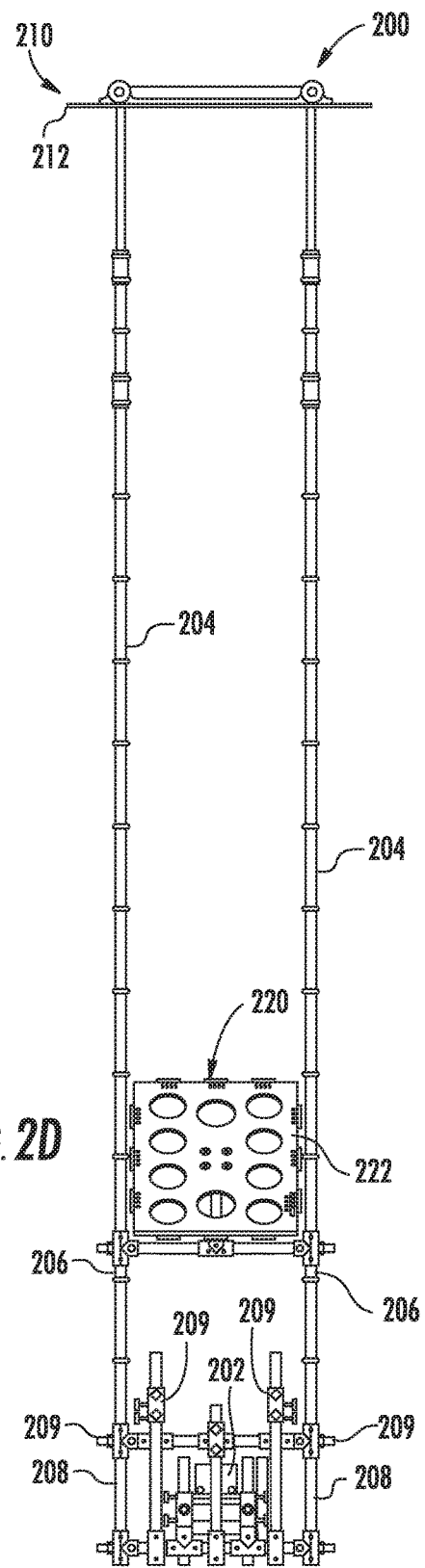
FIG. 2D is a front view of the night vision test fixture of FIG. 1A.

An advantage of the night vision test fixtures 200 is that they are compact and portable, enabling ready set up and removal from a flight simulator environment. For example, FIG. 1C is a top-down view of a flight simulator in which the flight deck 103 in the enclosure 102 includes a first pilot seat 106 and a second pilot seat 106' in a side-by-side arrangement. For such an enclosure 102, a night vision test fixture 200 could be arranged in front of the first pilot seat 106 to test the operation of a night vision imaging system with respect to the first pilot seat 106. Because the night vision test fixture 200 is compact, a second night vision test fixture 200' could be placed in front of the second pilot seat 106' at the same time, such that the night vision imaging systems for each of the pilot seats 106 and 106' could be tested simultaneously. Alternatively, because the night vision test fixture 200 is portable, a night vision test fixture could be rapidly moved from the position indicated by reference numeral 200 to the position indicated by reference numeral 200' to sequentially test a night vision imaging system from the first pilot seat 106 and then the second pilot seat 106'.

FIGS. 2A-2F illustrate various views of the night vision test fixture 200. The night vision test fixture 200 includes a support structure that includes base frame members 208 and telescoping frame members 204 and 206. The base frame members 208 engage a ground surface (e.g., the ground surface 124 illustrated in FIGS. 1A and 1B) and support the telescoping frame members 204 and 206. The base frame members 208 also support the starlight generator 202 in an orientation such that simulated starlight output by the starlight generator 202 in hinges on the visual target assembly 210.

The telescoping frame members 206 are extendable from the base frame members 208, and the mirror assembly 220 is connected to the telescoping frame members 206. By extending the telescoping frame members 206, a height of the mirror assembly 220 above the base frame members 208 can be adjusted. The mirror assembly 220 includes a mounting plate 222 that can support a mirror 224. The mounting plate 222 is connected to the telescoping frame members 206 by a mounting shaft 226 and a pivot 228. The mounting plate 220, the mirror 224, and the mounting shaft 226 can be rotated about the pivot 228 to adjust an angle θ of the mounting plate 222 and the mirror 224 relative to the telescoping frame members 204 and 206.

The telescoping frame members 204 are extendable from the telescoping frame members 206, and the visual target assembly 210 is connected to the telescoping frame members 204. By extending the telescoping frame members 204, a distance of the visual target assembly 210 above the mirror assembly 220 can be adjusted. The visual target assembly 210 includes a visual target holder 212 with a visual target 214 attached thereto. In various aspects, the visual target holder 212 is arranged at an orthogonal angle relative to the telescoping frame members 204 such that the visual target 214 is also arranged an orthogonal angle relative to the telescoping frame members 204. As discussed above, in a least one aspect, the visual target 214 includes an image of the United States Air Force 1951 Medium Contrast Resolution Resolving Power Target.

In various aspects, at least portions of the night vision test fixture 200 could be made of plastic or a lightweight metal, such as aluminum. For example, the base frame members 208 and the telescoping frame members 206 and 204 could be made from polyvinylchloride (PVC) tubing or aluminum tubing. Additionally, the mounting shaft 226, the mounting plate 220 and the visual target holder 212 could be made of plastic or lightweight metals.

FIG. 3 is a perspective view of the mirror 224 according to at least one aspect. In the at least one aspect, the mirror 224 is a first surface mirror, meaning that a reflective surface 252 of the mirror is above or in front of a substrate 250 of the mirror. Put differently, light impinging on the mirror 224 (indicated by arrow 254) reflects directly off of the reflective surface 252 (as indicated by arrow 256) instead of passing through a material (e.g., glass prior to reflecting. First surface mirrors can generally provide a high-quality reflection of an image because any reflected image would not include "ghost" images caused by faint reflections off of a clear substrate (e.g., glass) in front of the reflective surface. The reflective surface 252 could be an aluminum material or a gold material deposited on the substrate 250, for example.

Figure 4:
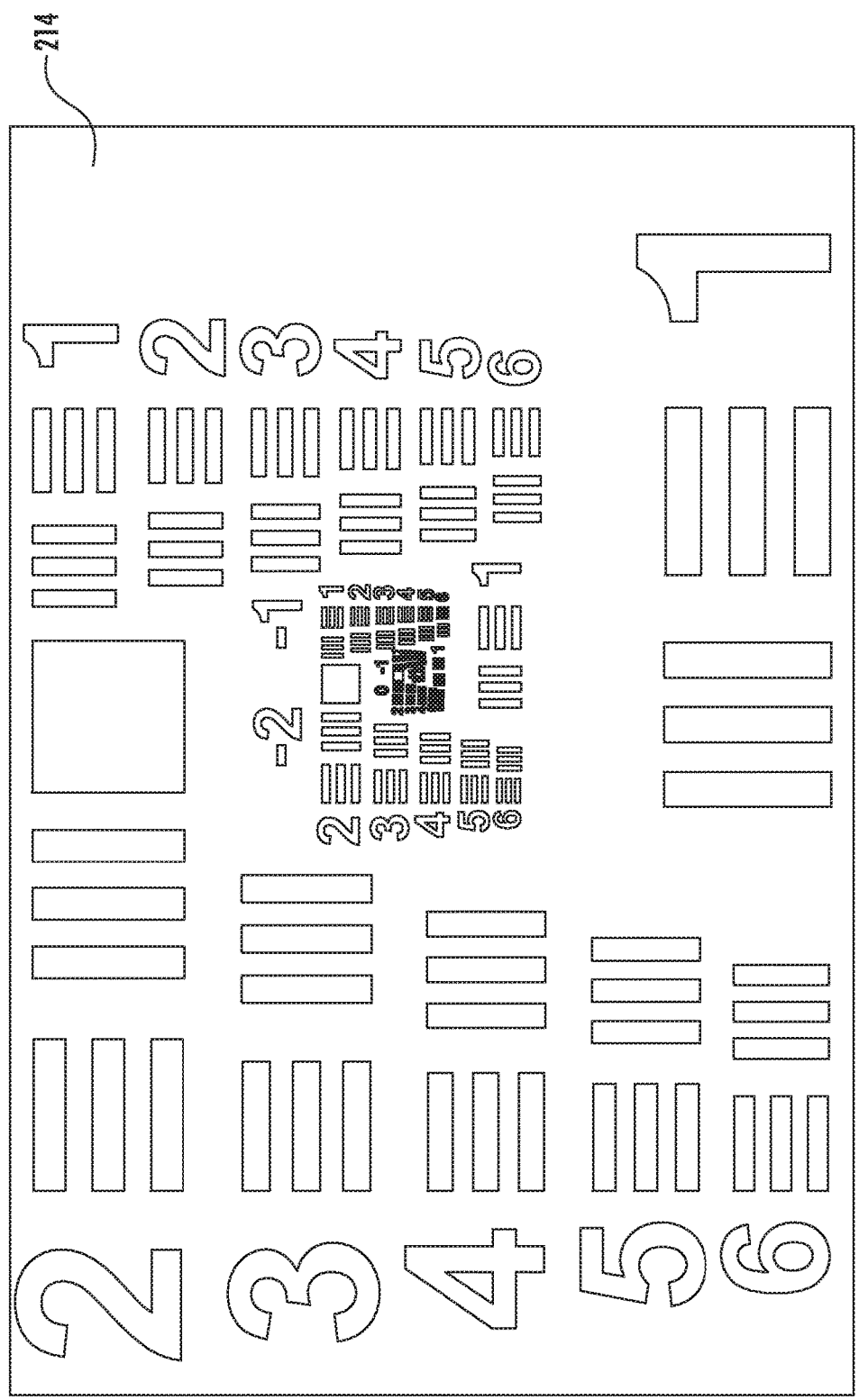
FIG. 4 is a front view of a visual target.

FIG. 4 illustrates the visual target 214 according to at least one aspect. Specifically, FIG. 4 illustrates a visual target 214 that includes the United States Air Force 1951 Medium Contrast Resolution Resolving Power Target. As depicted, the United States Air Force 1951 Medium Contrast Resolution Resolving Power Target includes successively smaller patterns of vertical and horizontal lines as well as the numerals 1 through 6. In use, a pilot or other operator would be located a fixed distance from the United States Air Force 1951 Medium Contrast Resolution Resolving Power Target, and a visual acuity of the pilot or other operator would be determined based on the smallest set of patterns and/or numerals that the pilot or other operator could discern at the fixed distance. Similarly, when used in conjunction with a night vision imaging system (e.g., night vision goggles), performance of the night vision imaging system is determined based on the smallest set of patterns and/or the smallest numerals from the United States Air Force 1951 Medium Contrast Resolution Resolving Power Target that the night vision imaging system can resolve. In various other aspects, different visual acuity charts, such as a Snellen eye chart or a "tumbling E" chart could be used as the visual target 214.

Figure 5:
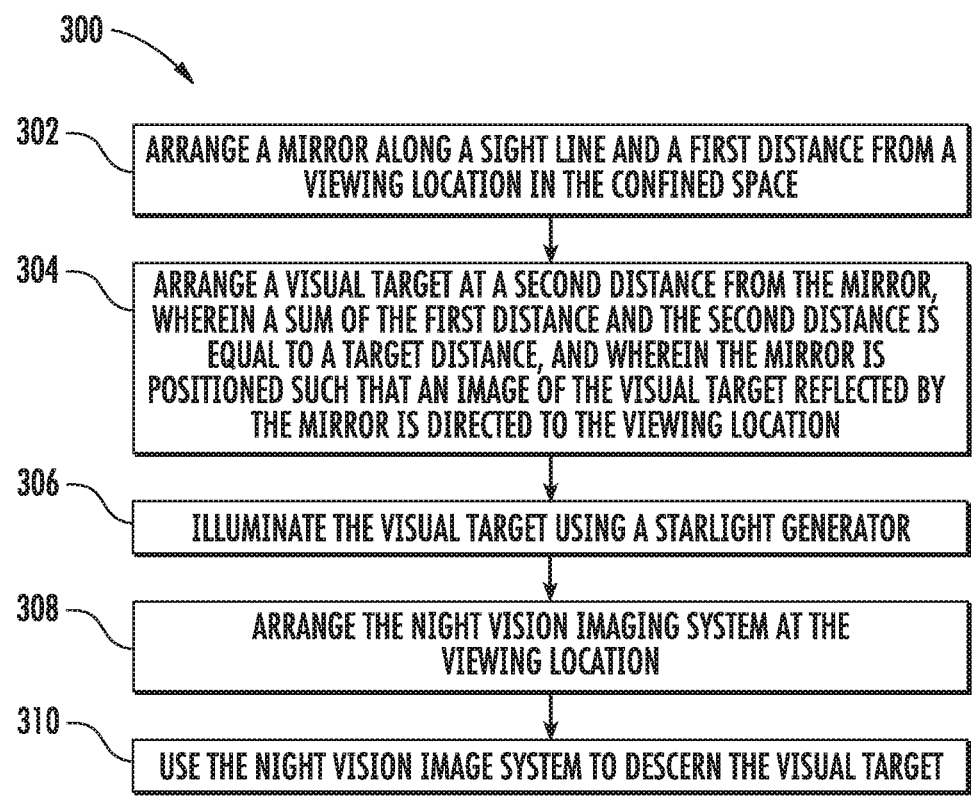
FIG. 5 is a flow chart for a process of testing use of a night vision imaging system in a confined space.

FIG. 5 illustrates a process 300 for using the night vision test fixture 200 to test a night vision imaging system. In block 302 of the process 300, a mirror is arranged along the site line in a first distance reviewing location of a confined space. Referring to FIG. 1A, the night vision test fixture 200 could be placed between an enclosure 102 and a display screen 120 of a flight simulator 100. The night vision test fixture 200 would be placed such that the mirror 224 on the mirror assembly 220 is arranged at a first distance $d_1$ from a position of the night vision imaging system 110 (e.g., night vision goggles being worn by a pilot 108). Also, with reference to FIGS. 2A-2F, adjustable members 209 of the base frame members 208 could be adjusted such that the telescoping frame members 206 and 204 are substantially vertically oriented. Additionally, the telescoping frame members 206 could be extended, if necessary, to accommodate different pilots 108 having different heights. For example, the telescoping frame members 206 could be fully retracted to accommodate a short pilot, partially extended from the base frame members 208 to accommodate an average pilot, and fully extended from the base frame members 208 to accommodate a tall pilot.

In block 304 of the process 300, the telescoping frame members 204 are extended to arrange the visual target 214 on the visual target assembly 210 at a second distance $d_2$ from the mirror 224 of the mirror assembly 220. As discussed above, the distances $d_1$ and $d_2$ are set such that the sum of the first distance $d_1$ and the second distance $d_2$ is equal to a target distance. For example, the target distance maybe 20 feet. In the event that the mirror assembly 220 is arranged 5 feet from the location of the pilot 108 using night vision goggles 110, the telescoping frame members 204 would be extended to a degree such that the visual target 214 on the visual target assembly 210 is arranged 15 feet from the mirror assembly 220. After the telescoping frame members 204 have been adjusted to set the distance $d_2$ between the visual target 214 and the mirror 224, at least some of the adjustable members 209 of the base frame members 208 may be adjusted to align the starlight generator 202 with the visual target 214. Furthermore, the angle θ of the mirror assembly 220 can be adjusted at the pivot 228 so that the pilot 108 in the pilot seat 106 can see the image of the visual target 214 in the mirror 224.

After the pilot 108 is situated in the pilot seat 106 and can see the image of the visual target 214 reflected in the mirror 224, the visual target 214 can be illuminated by the starlight generator 202 in block 306 of the process 300. Additionally, any ambient lighting can be dimmed or turned off, and any illumination 104 on the flight deck 103 can be turned on. In block 308, the night vision imaging system can be set up at the viewing location. For example, the pilot 108 can put on or turn on night vision goggles. Thereafter, in block 310, the pilot 108 can use the night vision imaging system 110 to read the visual target 214. With reference to FIG. 4, the pilot 108 could identify the smallest vertical/horizontal lines and/or the smallest numerals on the United States Air Force 1951 Medium Contrast Resolution Resolving Power Target that can be discerned using the night vision imaging system 110.

In the event the pilot cannot discern the same lines and/or numerals or lines and/or numbers that are sufficiently small after the cockpit illumination is turned on, then the combination of the night vision imaging system 110 being tested and the illumination 104 on the flight deck 103 may be deemed incompatible.

As discussed above, in various instances, the flight simulator environment may include certain constraints that would prevent full use of the night vision test fixture 200. For example, the flight simulator 100 may be enclosed in a room having a ceiling that prevents the telescoping frame members 206 and 204 from extending to a required height to provide a total of 20 feet of distance between the night vision imaging system 110 and the visual target 214. If the mirror 224 has been placed 5 feet from the pilot 108 using a night vision imaging system 110 (e.g., wearing night vision goggles) and a test requires that the visual target 214 be placed 20 feet from the night vision imaging system 110, the visual target assembly 210 with the visual target 214 thereon must be 15 feet from the mirror 224. However, a ceiling or other structure may prevent the telescoping frame members 204 from extending to a sufficient degree to enable the visual target 214 to be 15 feet from the mirror 224. For example, the telescoping frame members 204 could be limited to an extension of 14 feet from the mirror 224 such that the total effective distance from the night vision imaging system 110 to the visual target is 19 feet. In such instances, a visual target 214 that has been scaled down by 5% could be used to account for the fact that the visual target is closer than the target distance of the test requirement. In various aspects, the night vision test fixture 200 could include a kit of visual targets 214 of different scales for use with different total visual distances between the night vision imaging system 110 and the visual target 214.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to certain aspects, other and further aspects o may be devised without departing from the basic scope thereof, and the scope thereof is determined by the claims that follow.

What is claimed is:

1. An apparatus, comprising:
   a night vision test fixture configured to be arranged between an enclosure and a display screen, wherein the enclosure houses a flight simulator flight deck that includes a pilot seat, and wherein the pilot seat and the display screen define a sight line, the night vision test fixture including:
      a support structure;
      a mounting plate supporting a mirror and arranged such that the mirror intersects the sight line;
      a visual target holder attached to the support structure and supporting a visual target; and
      a starlight generator attached to the support structure and arranged to output starlight on the visual target supported by the visual target holder,
      wherein at least one of the mounting plate and the visual target holder is adjustable to direct a reflected image of the visual target from the mirror to the pilot seat, and wherein a sum of a distance from the pilot seat to the mirror and a distance from the mirror to the visual target is equal to a target distance.

2. The apparatus of claim 1, wherein the target distance is substantially equal to a distance specified in a testing requirement.

3. The apparatus of claim 1, wherein at least one of the mounting plate and the visual target holder is adjustable to change the distance from the mirror to the visual target.

4. The apparatus of claim 1, wherein an angle of the mounting plate relative to the visual target holder is adjustable to direct the reflected image of the visual target from the mirror to the pilot seat.

5. The apparatus of claim 1, wherein a height of the mounting plate relative to the pilot seat is adjustable to direct a reflected image of the visual target from the mirror to the pilot seat.

6. The apparatus of claim 1, wherein the visual target comprises a United States Air Force 1951 Medium Contrast Resolution Resolving Power Target.

7. The apparatus of claim 1, wherein the pilot seat is a first pilot seat, wherein the night vision test fixture is a first night vision test fixture, wherein the flight simulator flight deck includes a second pilot seat arranged side-by-side relative to the first pilot seat, wherein the first night vision test fixture is aligned with the first pilot seat, and further comprising a second night vision test fixture aligned with the second pilot seat.

8. A night vision test fixture, comprising:
a support structure;
a visual target holder attached to the support structure and supporting a visual target
a mounting plate supporting a mirror and attached to the support structure, wherein at least one of the mounting plate and the visual target holder is adjustable to direct a reflected image of the visual target from the mirror in a direction of a sight line; and
a starlight generator attached to the support structure and arranged to output starlight on the visual target supported by the visual target holder.

9. The night vision test fixture of claim 8, wherein the mirror comprises a first surface mirror.

10. The night vision test fixture of claim 8, wherein a distance of the mounting plate to the visual target holder is adjustable.

11. The night vision test fixture of claim 10, wherein the visual target includes a plurality of visual targets, wherein the plurality of visual targets have different scales, and wherein the distance of the mounting plate to the visual target holder is adjusted based on the scale of a selected one of the plurality of visual targets.

12. The night vision test fixture of claim 8, wherein an angle of the mounting plate relative to the visual target holder is adjustable.

13. The night vision test fixture of claim 8, wherein the visual target comprises a United States Air Force 1951 Medium Contrast Resolution Resolving Power Target.

14. A method for testing use of a night vision imaging system in a confined space, comprising:
illuminating a visual target using a starlight generator, wherein the visual target is arranged at a first distance from a mirror, wherein the mirror is arranged along a sight line and a second distance from a viewing location in the confined space, wherein a sum of the first distance and the second distance is equal to a target distance, and wherein the mirror is positioned such that an image of the visual target reflected by the mirror is directed to the viewing location; and
using the night vision imaging system to discern the visual target from the viewing location.

15. The method of claim 14, wherein the mirror, visual target, and starlight generator are arranged on a fixture, and wherein the fixture is movable into a position relative to the confined space.

16. The method of claim 14, wherein the confined space is a flight deck of an aircraft.

17. The method of claim 16, wherein the night vision imaging system comprises night vision goggles, wherein the flight deck is illuminated with night lighting, and wherein using the night vision imaging system to discern the visual target comprises a user reading the image of the visual target generated by the night vision goggles.

18. The method of claim 14, wherein the confined space is a simulator flight deck of a flight simulator.

19. The method of claim 18, wherein the night vision imaging system comprises night vision goggles, wherein the simulator flight deck is illuminated with night lighting, and wherein using the night vision imaging system to discern the visual target comprises a user reading an image of the visual target generated by the night vision goggles.

20. The method of claim 14, wherein the visual target comprises a United States Air Force 1951 Medium Contrast Resolution Resolving Power Target.

* * * * *

UNITED STATES PATENT AND TRADEMARK OFFICE
CERTIFICATE OF CORRECTION

PATENT NO. : 10,091,497 B2
APPLICATION NO. : 15/015856
DATED : October 2, 2018
INVENTOR(S) : Dale T. Iwasa et al.

Page 1 of 1

It is certified that error appears in the above-identified patent and that said Letters Patent is hereby corrected as shown below:

On the Title Page

In item (54) and in the Specification, in Column 1, Line 1, in "Title", delete "IMAGINING" and insert -- IMAGING --, therefor.

In item (56), in Column 2, under "Other Publications", Line 3, delete ".konicaminalta." and insert -- .konicaminolta. --, therefor.

Signed and Sealed this
Eleventh Day of December, 2018

Andrei Iancu
*Director of the United States Patent and Trademark Office*

UNITED STATES PATENT AND TRADEMARK OFFICE
CERTIFICATE OF CORRECTION

PATENT NO. : 10,091,497 B2  
APPLICATION NO. : 15/015856  
DATED : October 2, 2018  
INVENTOR(S) : Dale T. Iwasa et al.

Page 1 of 1

It is certified that error appears in the above-identified patent and that said Letters Patent is hereby corrected as shown below:

On the Title Page

Item (72), Inventors: after Joseph T. Riegler, Mesa, AZ (US) add ";"

Item (72), Inventors: add Inventor "Steve D. Ellersick, Shoreline, WA (US);"

Item (72), Inventors: add Inventor "John Patrick Maloney, Hurricane, UT (US)"

Signed and Sealed this  
Eighteenth Day of August, 2020

Andrei Iancu  
*Director of the United States Patent and Trademark Office*